United States Patent
Tanaka

(10) Patent No.: US 8,145,387 B2
(45) Date of Patent: Mar. 27, 2012

(54) COMMUNICATIONS NETWORK OF PASSENGER PROTECTION SYSTEM

(75) Inventor: Tatsuki Tanaka, Nagoya (JP)

(73) Assignee: Denso Corporation, Kariya (JP)

( * ) Notice: Subject to any disclaimer, the term of this patent is extended or adjusted under 35 U.S.C. 154(b) by 366 days.

(21) Appl. No.: 12/590,616

(22) Filed: Nov. 10, 2009

(65) Prior Publication Data

US 2010/0121534 A1    May 13, 2010

(30) Foreign Application Priority Data

Nov. 12, 2008 (JP) ................................. 2008-290316
Aug. 3, 2009 (JP) ................................. 2009-180911

(51) Int. Cl.
*B60R 21/0136* (2006.01)
(52) U.S. Cl. ............. 701/45; 701/46; 701/29; 710/110; 710/104; 280/735; 280/736; 307/10.1
(58) Field of Classification Search ............. 701/29–36, 701/45, 46; 710/104, 110; 280/735–738; 307/10.1
See application file for complete search history.

(56) References Cited

U.S. PATENT DOCUMENTS

| | | | |
|---|---|---|---|
| 6,448,671 B1 | 9/2002 | Wallace et al. | |
| 6,566,765 B1 * | 5/2003 | Nitschke et al. | 307/10.1 |
| 6,944,526 B2 * | 9/2005 | Weichenberger | 701/45 |
| 7,085,863 B2 * | 8/2006 | Barenys et al. | 710/104 |
| 7,539,804 B2 | 5/2009 | Miura | |

FOREIGN PATENT DOCUMENTS

| | | |
|---|---|---|
| JP | 01-141440 | 6/1989 |
| JP | 06-236336 | 8/1994 |
| JP | 2001-503950 | 3/2001 |
| JP | 2002-305523 | 10/2002 |
| JP | 2003-143157 | 5/2003 |
| JP | 2004-268719 | 9/2004 |
| JP | 2006-511172 | 3/2006 |
| JP | 2006-165957 | 6/2006 |
| JP | 2007-215102 | 8/2007 |
| WO | WO 98/23124 | 9/1997 |
| WO | WO 2004/059917 | 7/2004 |

OTHER PUBLICATIONS

Office action dated Nov. 17, 2011 in corresponding Chinese Application No. 2009 10211726.9.

* cited by examiner

*Primary Examiner* — Richard M. Camby
(74) *Attorney, Agent, or Firm* — Harness, Dickey & Pierce, PLC

(57) ABSTRACT

A communications network for a passenger protection system of a vehicle has an electronic control unit and a plurality of sensors, which is bus-connected to the electronic control unit. Each of the sensors includes a current detection circuit for detecting a current of the sensor, and a control circuit including a memory. The control circuit sets a specific address for the sensor in the memory when the detected current attains a predetermined relation to a predetermined threshold current. The control circuit transmits a notification of completion of setting the specific address to the electronic control unit, and controls a mode of the sensor to a specific mode, which consumes current less than the predetermined threshold current.

24 Claims, 10 Drawing Sheets

COMMUNICATIONS NETWORK OF PASSENGER PROTECTION SYSTEM

CROSS REFERENCE TO RELATED APPLICATION

This application is based on and incorporates herein by reference. Japanese Patent Applications No. 2008-290316 filed on Nov. 12, 2008 and No. 2009-180911 filed on Aug. 3, 2009.

FIELD OF THE INVENTION

The present invention relates to a communications network of a passenger protection system, which has an electronic control unit (ECU) and a plurality of sensors. The ECU is equipped in a passenger protection device such as an airbag for protecting passengers at time of collision of vehicles. The sensors are connected to the ECU.

BACKGROUND OF THE INVENTION

Various passenger protection devices such as an airbag and a seatbelt pretensioner are equipped in vehicles recently. The passenger protection system including such a passenger protection device includes, as shown in FIG. 1, front sensors 11a, 11b mounted at both front left and right sides of a vehicle 10, safety sensors 13a, 13b mounted at a front or rear passenger seats in a passenger compartment, and a plurality of sensors (first to fourth sensors) 15a to 15d, 16a to 16d mounted at both left and right sides of the vehicle 10. These sensors are connected to an electronic control unit (ECU) 18, thus forming a communications network. Each of the sensors 11a, 11b, 13a, 13b, 15a to 15d, 16a to 16d detects travel speed or collision of the vehicle, and the ECU 18 activates airbags (not shown) based on the detected travel speed or collision. Each sensor is formed in an integrated circuit (IC).

In this communications network, as shown in FIG. 2, the sensors 15a to 15d, 16a to 16d have respective bus switches 26a to 26d in the inside parts and connected to the ECU 18 through buses. These switches 26a to 26d are closed by initialization of setting addresses from the sensor 15a closest to the ECU 18, when electric power is supplied in the vehicle 10.

Specifically, the bus switch of the first sensor 15a, which is closest to the ECU 18, is set with a first address and closed to connect the second sensor 15b to the ECU 18. After setting a second address to the second sensor 15b by the ECU 18, the bus switch 26b is closed to connect the third sensor 15c to the ECU 18. After setting a third address to the third sensor 15c by the ECU 18, the bus switch 26c is closed to connect the fourth sensor 15d to the ECU 18. The initialization is performed in this order. Each sensor 15a to 15d is configured to transmit a notification to the ECU 18 after setting the address in itself.

JP 2007-215102A (U.S. Pat. No. 7,539,804) discloses a similar conventional communications network, in which an ECU communicates with sensors by setting respective addresses as described above.

According to the conventional communications networks, the bus switch 26a to 26d need be provided within the IC chip of each sensor 15a to 15d to be connected to the ECU 18. As a result, each sensor 15a to 15d becomes large in size and expensive in cost.

Further, each bus switch 26a to 26d has its impedance, which causes a voltage drop. Therefore, the voltage drop at the last-stage sensor, for example sensor 15d, becomes large, as the number of sensors 15a to 15d connected in series to the ECU 18 increases.

In addition, the impedance of the bus switch 26a to 26d is not matched between the power supply side 21 and the ground side 22, and hence noises are generated.

SUMMARY OF THE INVENTION

It is therefore an object of the present invention to provide a communications network of a passenger protection system, in which a plurality of sensors is bus-connected to an electronic control unit without respective bus switches.

According to the present invention, a communications network for a passenger protection system of a vehicle comprises an electronic control unit and a plurality of sensors. The electronic control unit controls a passenger protection device upon collision of the vehicle. The plurality of sensors is bus-connected to the electronic control unit to detect and transmit a parameter related to the collision of the vehicle. Each of the sensors includes a current detection circuit and a control circuit. The current detection circuit detects a current of the sensor, and the control circuit includes a memory. The control circuit sets a specific address for the sensor in the memory when the current detected by the current detection circuit attains a predetermined relation to a predetermined threshold current. The control circuit transmits a notification of completion of setting the specific address to the electronic control unit. The control circuit controls a mode of the sensor to a specific mode, which consumes current less than the predetermined threshold current. The plurality of sensors are set with respective addresses and transmit notifications of completion of setting respective addresses to the electronic control unit at time of initialization for communications with the electronic control unit.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

The present invention will be described in detail with reference to various embodiments, in which the same or similar parts are designated by the same or similar parts and the same or similar description thereof is omitted for brevity.

First Embodiment

Figure 1:
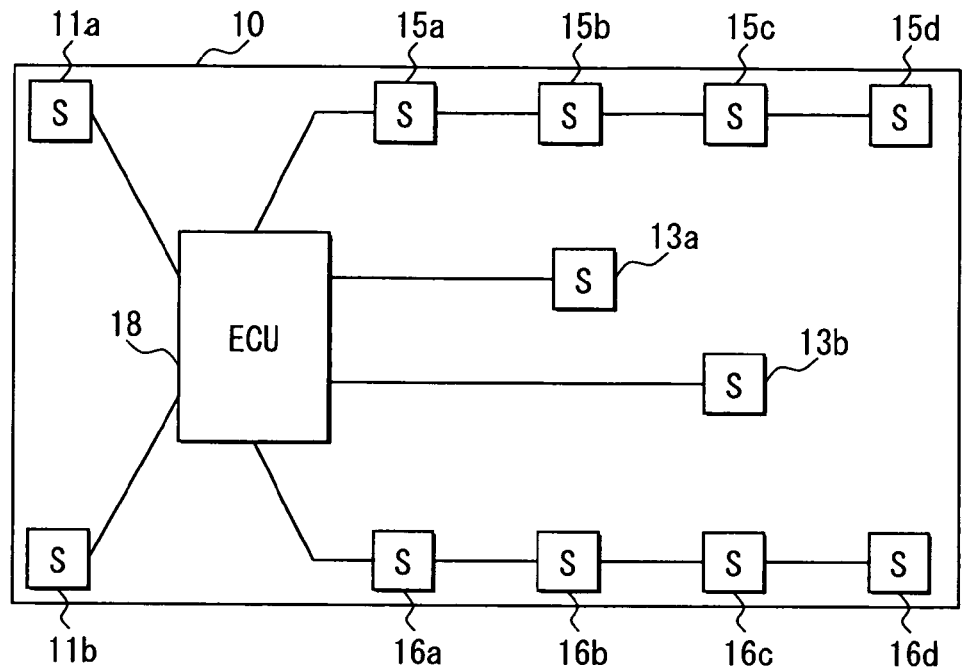
FIG. 1 is a schematic diagram showing an ECU and a plurality of sensors of a communications network of a conventional passenger protection system in a vehicle.
Figure 2:
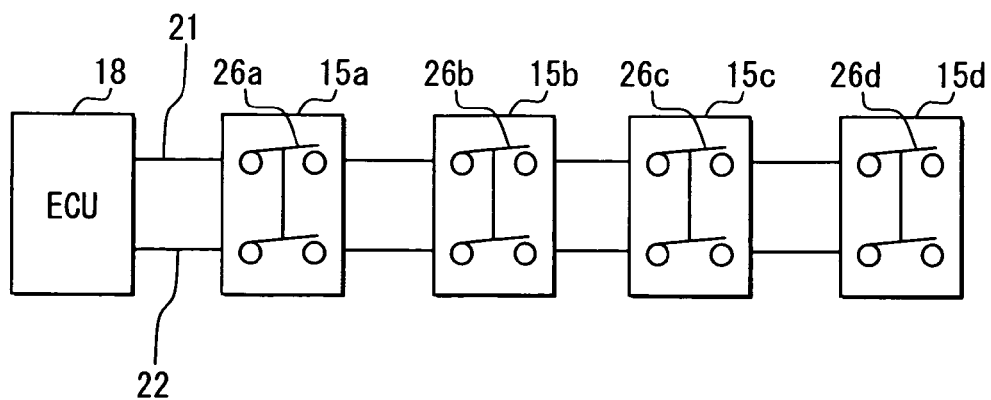
FIG. 2 is a schematic diagram showing the ECU and bus-connected sensors of the communications network of the conventional passenger protection system in a vehicle.
Figure 3A:
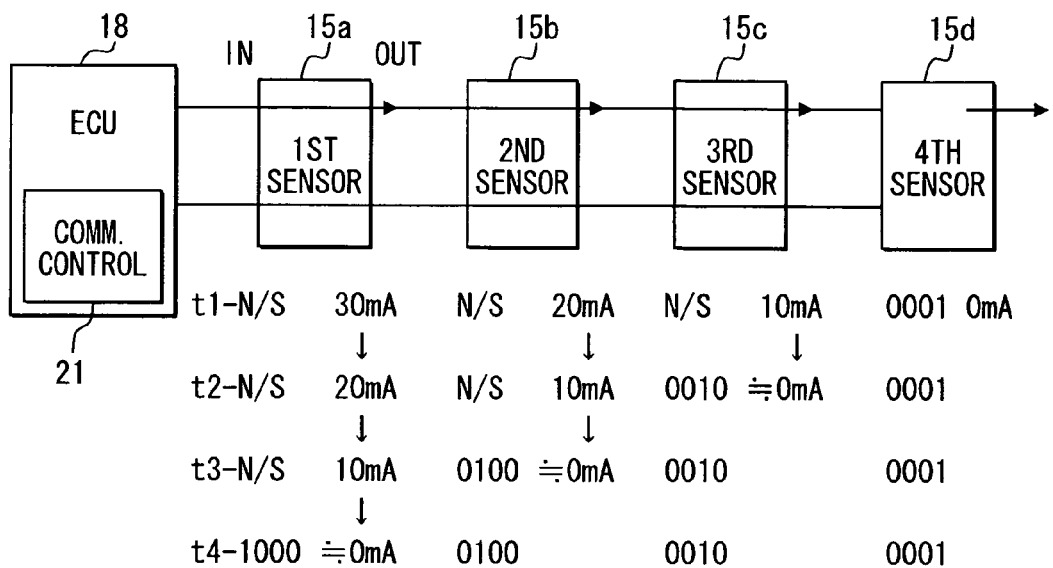
FIG. 3A is a schematic diagram showing a communications network of a passenger protection system according to a first embodiment of the present invention.

Referring to FIG. 3A, a communications network of a passenger protection system is configured with an electronic control unit (ECU) 18 for an airbag device and a plurality of sensors bus-connected to the ECU 18. Only right-side sensors 15a to 15d are shown as the first to the fourth sensors 15a to 15d connected in series.

Figure 3B:
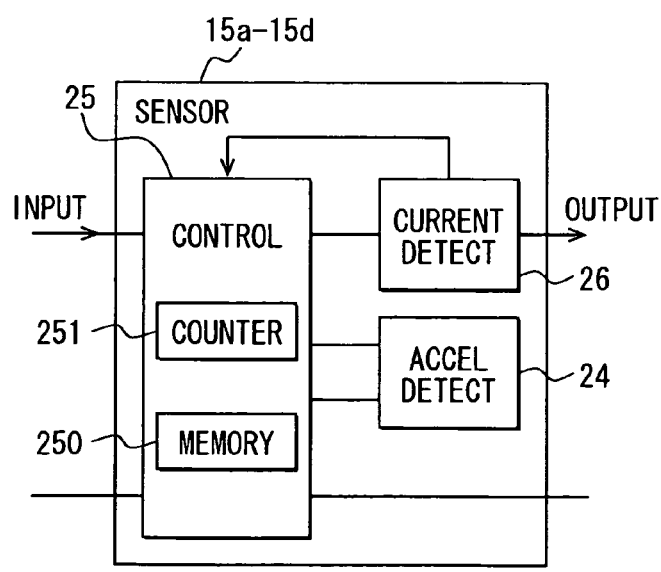
FIG. 3B is a block diagram showing each sensor in the first embodiment.

The ECU 18 includes a communications control circuit 21. Each sensor 15a to 15d includes, as shown in FIG. 3B, an acceleration detection circuit 24, a control circuit 25 and a current detection circuit 26. The control circuit 25 includes a memory 250 such as a RAM and a counter 251, and is connected to the acceleration detection circuit 24 and the current detection circuit 26.

The current detection circuit 26 is configured to detect a current, which flows from an output side in each sensor and supplies the detected current to the control circuit 25. Each sensor 15a to 15d is configured to supply a current of 10 milliamperes (mA) from its output side to the next sensor, when it is operated in the normal communications mode. Since four sensors 15a to 15d are bus-connected, a current of 40 mA flows from the output side of the ECU 18.

When all the sensors 15a to 15d are in operation, the first sensor 15a supplies a current of 30 mA to its output side at time t1, because three sensors 15b to 15d are connected to its output side. At the this time t1, the second sensor 15b, the third sensor 15c and the fourth sensor 15d supply currents of 20 mA, 10 mA and 0 mA, respectively.

When each sensor 15a to 15d is in the sleep mode, the sensor generally consumes no current (0 mA). For example, if the fourth sensor 15d is in the sleep mode as shown at time t2, the current of supplied from the output side of the third sensor 15c is about 0 mA. This condition corresponds to the condition that the third sensor 15c is not connected to any sensors at its output side.

The control circuit 25 in each sensor is configured to control communications with the ECU 18. The communications includes transmission of the value of acceleration of the vehicle 10 detected by the acceleration detection circuit 24. When the current detected by the current detection circuit 26 is less than a predetermined threshold current required for the operation mode, the counter 251 starts to its count operation. The memory 250 stores and sets a specific address corresponding to the count value of the counter 251 produced after starting the count operation. The control circuit 25 is configured to transmit a notification indicating completion of this setting to the ECU 18. The set specific address is stored. The control circuit 25 is configured to control the sensor to proceed to a specific mode, in which the sensor consumes only a small amount of current less than the threshold current required for the normal operation.

The specific mode includes the following first to fourth modes.

(1) The first mode is a current consumption mode, in which a small amount of current (several mA) is consumed to perform an open-check. This is for checking whether each sensor 15a to 15d, is connected to the ECU 18. When the sensors 15a to 15d are connected to the ECU 18 normally, the current becomes greater than the threshold current. However, when the sensor is disconnected from the ECU 18, the current becomes less than the threshold current. Thus, the disconnection between the ECU 18 and the sensors 15a to 15d, that is, open circuit condition, is detected.

(2) The second mode is also a current consumption mode, in which an amount of current is consumed to perform a sensor initial check. This is for checking by a CPU whether memories such as a RAM, ROM and the like are normal.

(3) The third mode is also a current consumption mode, in which an amount of current is consumed under a condition that only the acceleration detection circuit 24 is stopped from operating to protect the address-set sensor from operating erroneously.

(4) The fourth mode is a current consumption mode for proceeding to the sleep mode, in which a current of stand-by power is consumed to only maintain the set specific address after setting it in the memory 250. The current of stand-by power is close to zero.

The control circuit 25 is configured to release the sleep mode of the sensor in response to the sleep mode release command so that the sensor returns to the operation mode, when the ECU 18 outputs a command of releasing the sleep mode.

The communications control circuit 21 of the ECU 18 is configured to control communications with the sensors 15a to 15d. The communications control circuit 21 transmits commands of the specific modes, for example, the sleep mode release command, to each sensor 15a to 15d, when notifications indicating completion of address setting are transmitted from all the sensors 15a to 15d.

Figure 4:
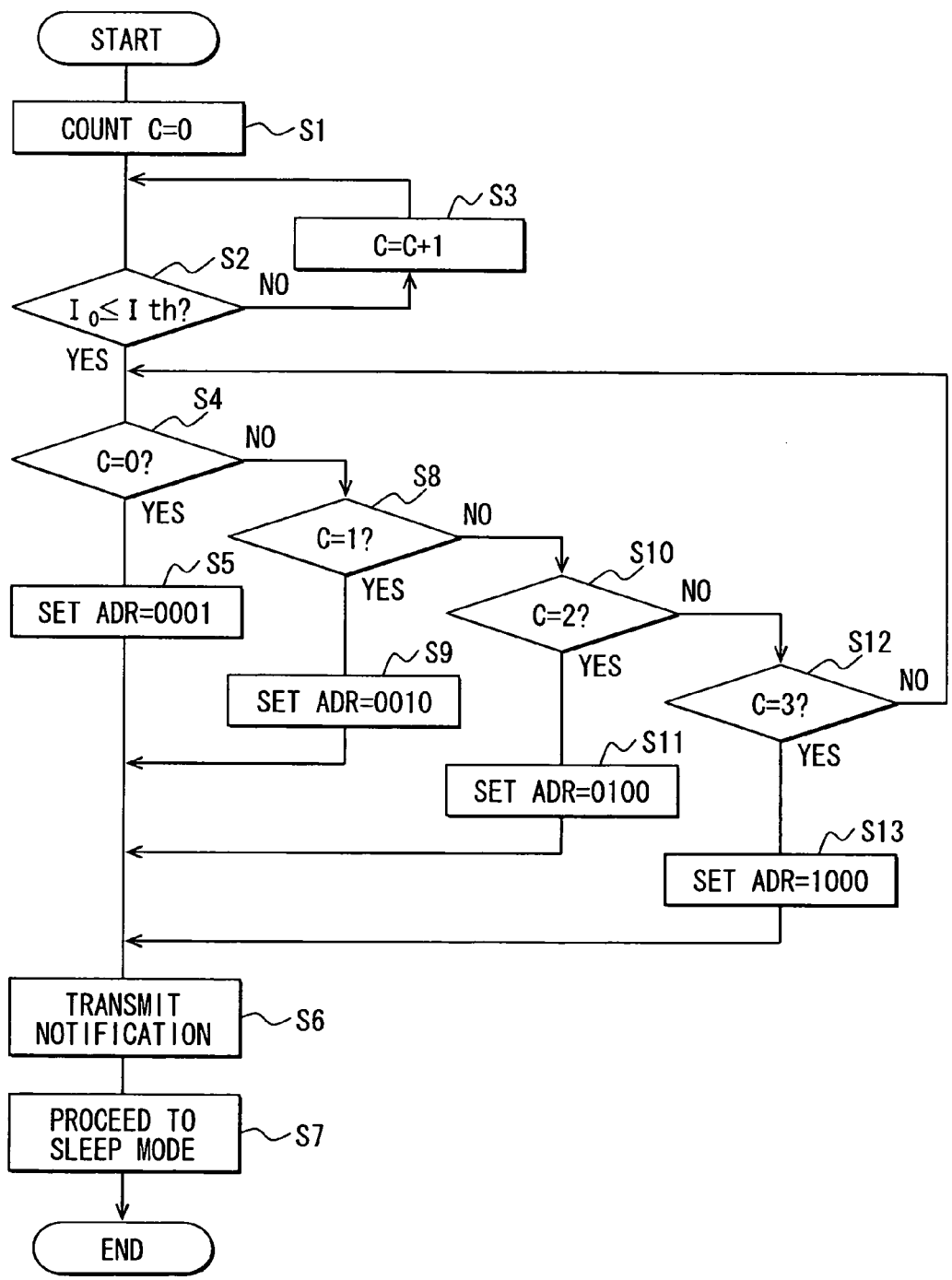
FIG. 4 is a flowchart showing processing performed by each sensor in the first embodiment.

The operation of the first embodiment is described with reference to the processing shown in FIG. 4, which is performed by the control circuit 25 in each sensor 15a to 15d. The processing of the sensors 15a to 15d is shown in FIG. 4 as if all the processing is performed by one control circuit 25. This processing may be started when the power supply is started in the vehicle 10.

First at step S1, a count value C of the counter 251 is initialized to zero (C=0). The count value is used to specify each sensor 15a to 15d.

At step S2, it is checked whether the output current Io detected by the current detection circuit 26 attained a predetermined relation to the predetermined threshold current Ith, that is, whether the detected output current Io is equal to or less than the predetermined threshold current Ith, which is about 0 mA. It is assumed here that, as shown at time t1 in FIG. 3A, the currents of the first to the fourth sensors 15a to 15d are 30 mA, 20 mA, 10 mA and 0 mA, respectively.

Under this assumption, since the check results of step S2 are NO in the first to the third sensors 15a to 15c, the count value C of the counter 251 is incremented by one (C=C+1) at step S3. In this case, the count value C is set to 1.

In the fourth sensor 15d, with the check result at step S2 being YES, it is checked at step S4 whether the count value C is zero (C=0). Since the count value C is 0 (C=0), a predetermined specific address ADR=0001 is set in the memory 250 at step S5. At this time t1, the addresses ADR of the other sensors, the first to the third sensors 15a to 15c, are not fixed or set (ADR=N/S). After this address setting, a notification is transmitted to the ECU 18 at step S6. This notification is indicative of completion of address setting in the fourth sensor 15d. Then, at step S7, the fourth sensor 15d is set to operate in the specific mode, for example, sleep mode.

After the fourth sensor 15d is set to the sleep mode, the output current Io supplied from the third sensor 15c substantially becomes zero at time t2 as shown in FIG. 3A. The output current Io of the second sensor 15b and the first sensor 15a become 10 mA and 20 mA; respectively.

In this instance, since the check results at step S2 are NO in the first sensor 15a and the second sensor 15b because the output currents Io are greater than the threshold current Ith, respectively, the count value C of the counter 251 is incremented by one (C=C+1). The count value C therefore becomes 2.

In the third sensor 15c, since the detected output current Io is zero (Io=0), it is checked at step S4 whether the count value C is zero (C=0). Since the count value C is 1 (C=1), the check result at step S3 is NO. In this instance, it is checked at step S8 whether the count value C is 1 (C=1). Since the count value C is 1, that is, check result of step S8 is YES, a specific address ADR=0010 is set in the memory 250 at step S9. After this address setting, a notification is transmitted to the ECU 18 at step S6. This notification is indicative of completion of address setting in the third sensor 15c. Then, at step S7, the third sensor 15d is set to operate in the specific mode, for example, sleep mode.

After the third sensor 15c is set to the sleep mode, the output current Io supplied from the second sensor 15b substantially becomes zero at time t3 as shown in FIG. 3A. The output current Io of the first sensor 15a becomes 10 mA.

In this instance, since the check result at step S2 is NO in the first sensor 15a because the output current Io is greater than the threshold current Ith, the count value C of the counter 251 is incremented by one (C=C+1) at step S3. The count value C therefore becomes 3.

In the second sensor 15b, since the detected output current Io is zero (Io=0), it is checked at step S4 whether the count value C is zero (C=0). Since the count value C is 2 (C=2), the check result at step S3 is NO. In this instance, it is checked at step S8 whether the count value C is 1 (C=1). Since the check result of step S8 is NO, it is further checked at step S10 whether the count value C is 2 (C=2). With the count value C being 2 (C=2), a specific address ADR=0100 is set in the memory 250 at step S11. After this address setting, a notification is transmitted to the ECU 18 at step S6. This notification is indicative of completion of address setting in the second sensor 15c. Then, at step S7, the second sensor 15d is set to operate in the specific mode, for example, sleep mode.

After the second sensor 15c is set to the sleep mode, the output current Io supplied from the second sensor 15b substantially becomes zero at time t4 as shown in FIG. 3A.

In this instance, the check result at step S2 is YES in the first sensor 15a. It is then checked at step S4 whether the count value C is zero (C=0). Since the count value C in the first sensor 15a is 3 (C=3), the check result at step S4 is NO. In this instance, it is checked at step S8 whether the count value C is 1 (C=1). Since the check result of step S8 is NO, it is further checked at step S10 whether the count value C is 2 (C=2). Since the check result at step S10 is NO, it is further checked at step S12 whether the count value C is 3 (C=3). With the count value C being 3 (C=3), that is, the check result at step S12 is YES, a specific address ADR=1000 is set in the memory 250 at step S13. After this address setting, a notification is transmitted to the ECU 18 at step S6. This notification is indicative of completion of address setting in the first sensor 15c. Then, at step S7, the first sensor 15d is set to operate in the specific mode, for example, sleep mode.

When the ECU 18 receives the notifications from all the sensors 15a to 15d, the communications control circuit 21 transmits a sleep mode release command to each sensor 15a to 15d. Each sensor 15a to 15d returns to the normal operation mode upon receiving the sleep mode release command. In this example, since the specific mode is assumed to be the sleep mode, the ECU 18 transmits the sleep mode release command. When the specific mode set in the sensors 15a to 15d is any one of the first to the third current consumption modes (1) to (3) other than the sleep mode (4), the ECU 18 transmits a release command which corresponds to the set specific mode. Thus, when the sensors 15a to 15d are set in the specific mode, the ECU 18 transmits a command that releases the sensors 15a to 15d from the specific modes so that the sensors 15a to 15d return to the normal operation mode.

In the communications network according to the first embodiment, a plurality of sensors 15a to 15d is bus-connected to the ECU 18 to communicate with the ECU 18. Each sensor 15a to 15d has the acceleration detection circuit 24, the control circuit 25 and the current detection circuit 26. The acceleration detection circuit 24 detects the acceleration of the vehicle 10, and the control circuit 25 transmits the detected acceleration to the ECU 18. The current detection circuit 26 detects the current flowing from the output side of each sensor. When the detected current is less than the threshold current, the control circuit 25 sets and stores the specific address in the memory 250. This specific address is different from one sensor to the other. The control circuit 25 further transmits the notification indicative of the completion of address setting, and sets and proceed to the specific mode. In the specific mode, such as the sleep mode, the current consumed in each sensor is less than the current required to operate in the normal operation mode.

For example, when the supply of electric power is started in the vehicle 10, the output current of the fourth (last-stage) sensor 15d becomes approximately 0 mA, which is less than the predetermined threshold current. The current detection circuit 26 of the fourth sensor 15d detects this and the control circuit 25 of the fourth sensor 15d sets the specific address in the memory 250 of the fourth sensor 15d. The control circuit 25 transmits the notification indicative of the completion of address setting in the fourth sensor 15d and sets the fourth sensor 15d to operate in the specific mode, for example, sleep mode. With the fourth sensor 15d being set in the sleep mode, the output current of the third sensor 15c preceding the fourth sensor 15d becomes approximately 0 mA, which is less than the predetermined threshold value. The current detection circuit 26 of the third sensor 15c detects this and the control circuit 25 of the third sensor 15c sets the specific address in the memory 250 of the third sensor 15c. The control circuit 25 transmits the notification indicative of the completion of address setting in the third sensor 15d and sets the third sensor 15c to operate in the specific mode, for example, sleep mode. The similar operations are performed in the second sensor 15b and then in the first sensor 15a, the specific addresses are set in the second sensor 15b and then in the first sensor 15a.

As described above, each sensor 15a to 15d need not have a bus switch. As a result, the size and cost of each sensor can be reduced, the voltage drop at the last-stage sensor can be reduced, and the noise generation due to unmatched impedance can be suppressed.

In the ECU 18, the communications control circuit 21 transmits the sleep mode release command to all the sensors 15a to 15d after receiving the notifications of all the sensors 15a to 15d indicating the completion of address setting. Thus, each sensor 15a to 15d is released from the sleep mode in response to the sleep mode release command, and returns to the normal operation mode.

Each sensor 15a to 15d receives the specific mode release command to return to the normal operation mode after completing the address setting. As a result, each sensor 15a to 15d is enabled to communicate with the ECU 18 in the normal operation mode by using its specific address.

Second Embodiment

The second embodiment is shown in FIGS. 3A and 3B.

The second embodiment is different from the first embodiment in that each sensor 15a to 15d has an address registering circuit 252 in place of the counter 251.

The control circuit 25 in each sensor 15a to 15d is configured to control communications with the ECU 18. The communications includes transmission of the detected acceleration of the vehicle 10. When the detected current is less than the predetermined threshold current, the control circuit 25 stores in the memory 250 a specific address, which is not set in the address registering circuit 252. The control circuit 25 is configured to transmit the notification indicating the completion of address setting to the ECU 18. The set specific address is stored. The control circuit 25 is configured to control the sensor to operate in the specific mode. The control circuit 25 is further configured to release the specific mode of the sensor upon receiving the specific mode release command from the ECU 18, so that the sensor may return to the normal operation mode.

Figure 6:
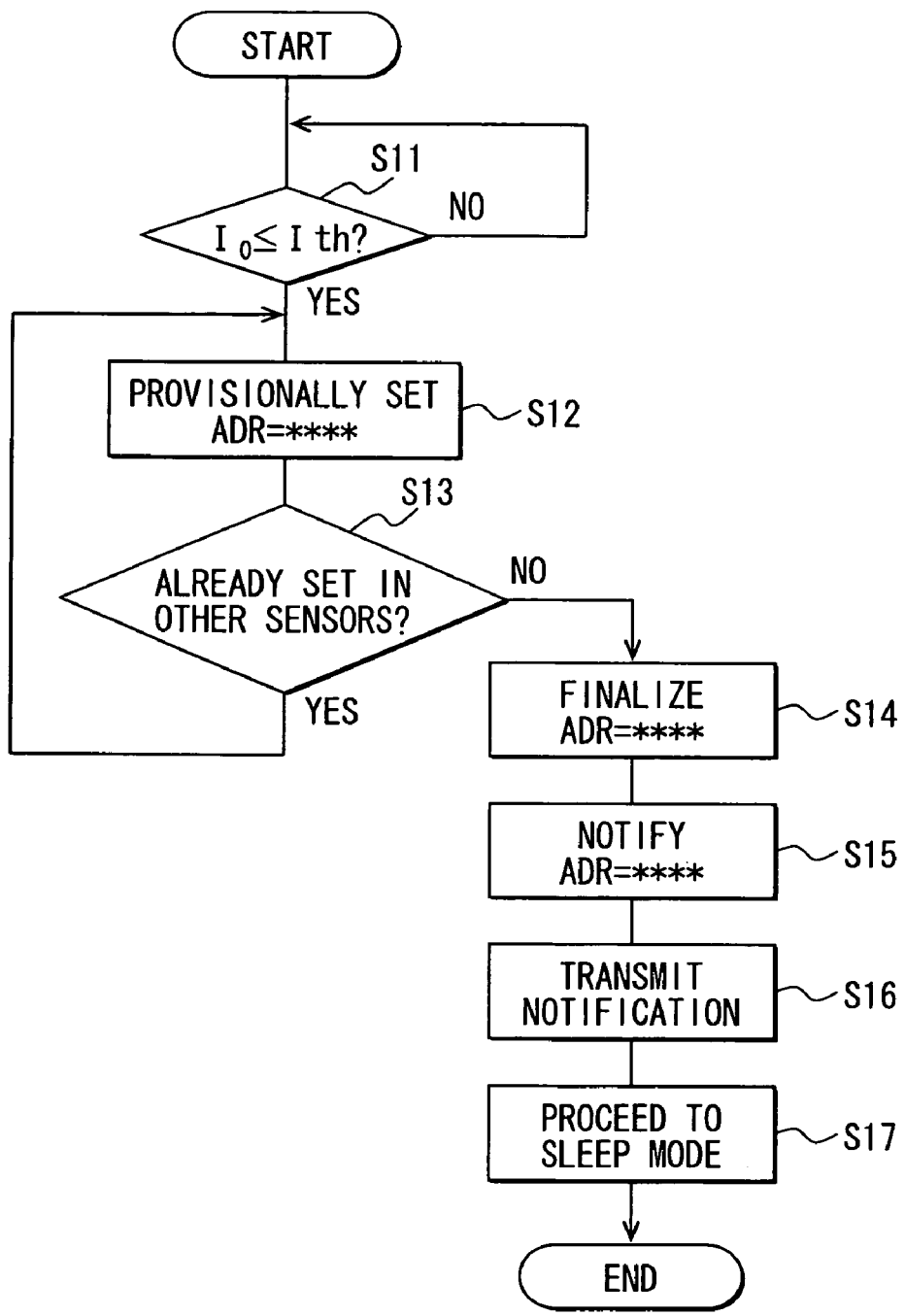
FIG. 6 is a flowchart showing processing performed by each sensor in the second embodiment.

The operation of the second embodiment is described with reference to the processing shown in FIG. 6, which is performed by the control circuit 25 in each sensor 15a to 15d.

This processing may be started when the power supply is started in the vehicle 10. It is assumed that no addresses are set in the sensors 15a to 15d.

First at step S11, it is checked whether the output current Io detected by the current detection circuit 26 is equal to or less than the predetermined threshold current Ith, which is about 0 mA. It is assumed here that, as shown at time t1 in FIG. 5A, the currents of the first to the fourth sensors 15a to 15d are 30 mA, 20 mA, 10 mA and 0 mA, respectively.

In this instance, the output current Io of the fourth sensor 15d detected by the current detection circuit 26 of the fourth sensor 15d is less than the predetermined threshold current Ith. With the check result being YES at step S11, the control circuit 25 provisionally sets an address to ADR=**=0001 at step S12. It is checked at step S13 whether the provisional address ADR=0001 is stored in the address registering circuit 252, thereby checking whether the address ADR=0001 has already been set in any of the sensors 15a to 15d. Steps S12 and S13 are repeated until the check result at step S13 becomes NO, that is, until the provisional address ADR= has not ever been set in any of the sensors 15a to 15d**.

If the provisional address ADR=0001 has not been registered in the address registering circuit 252, this address ADR=0001 is finalized and stored in the memory 250 as the specific address for the fourth sensor 15d at step S14. This finalized specific address ADR=0001 is notified at step S15 to all the preceding sensors, that is, the first to the third sensors 15a to 15c, which are between the ECU 18 and the input side of the fourth sensor 15d. Each sensor, for example, the first to the third sensors 15a to 15c, receives this specific address ADR=**=0001 of the fourth sensor 15d and registers it in its address registering circuit 252**.

After this address setting, a notification is transmitted to the ECU 18 at step S16. This notification is indicative of completion of address setting in the fourth sensor 15d. Then, at step S17, the fourth sensor 15d is set to operate in the specific mode, for example, sleep mode.

Figure 5A:
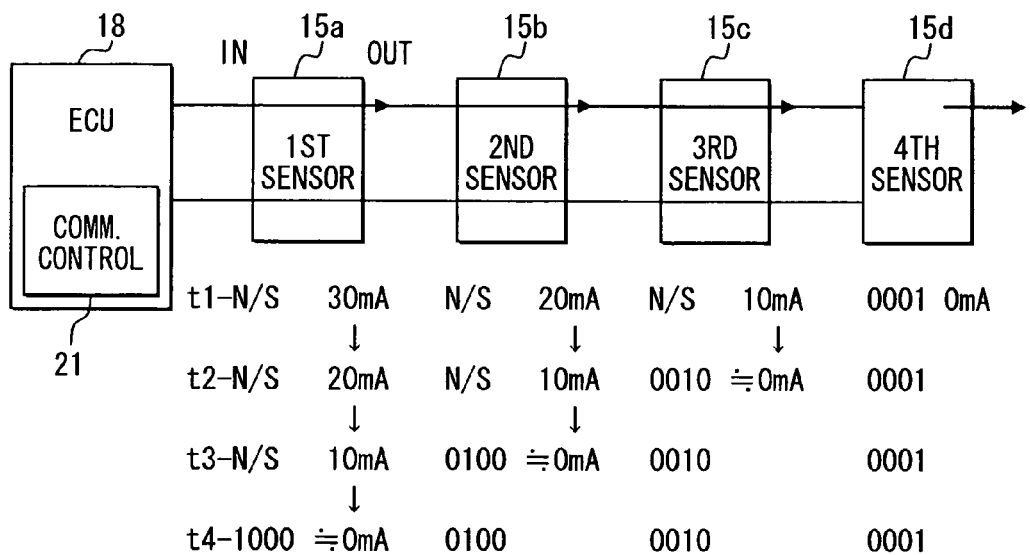
FIG. 5A is a schematic diagram showing a communications network of a passenger protection system according to a second embodiment of the present invention.

After the fourth sensor 15d is set to the sleep mode, the output current Io supplied from the third sensor 15c substantially becomes zero at time t2 as shown in FIG. 5A. The currents Io of the second sensor 15b and the first sensor 15a become 10 mA- and 20 mA, respectively.

In this instance, the output current Io of the third sensor 15c detected by the current detection circuit 26 of the third sensor 15c is less than the predetermined threshold current Ith. With the check result being YES at step S11, the control circuit 25 provisionally sets the address to ADR=**=0010 at step S12. It is checked at step S13 whether the provisional address ADR=0001 is stored in the address registering circuit 252, thereby checking whether the address ADR=0010 has already been set in any of the sensors 15a to 15d. If the provisional address ADR=0010 has not been registered in the address registering circuit 252, this address ADR=0010 is finalized and stored in the memory 250 as the specific address for the third sensor 15c at step S14. This finalized specific address ADR=0010 is notified at step S15 to all the preceding sensors, that is, the first and the second sensors 15a and 15b, which are between the ECU 18 and the input side of the third sensor 15c. Each sensor, for example, the first and the second sensors 15a and 15b, receive this specific address ADR==0010 of the third sensor 15c and registers it in its address registering circuit 252**.

After this address setting, a notification is transmitted to the ECU 18 at step S16. This notification is indicative of completion of address setting in the third sensor 15c. Then, at step S17, the third sensor 15c is set to operate in the specific mode, for example, sleep mode.

After the third sensor 15d is set to the sleep mode, the output current Io supplied from the second sensor 15b substantially becomes zero at time t3 as shown in FIG. 5A. The output current Io of the first sensor 15a becomes 10 mA.

The similar operations are performed in the second sensor 15b and then in the first sensor 15a, the specific addresses ADR=0100 and ADR=1000 are set in the second sensor 15b and then in the first sensor 15a, respectively. Thus, the output current supplied from ECU 18 becomes 0 mA in the end. When the ECU 18 receives the notifications from all the sensors 15a to 15d, the communications control circuit 21 transmits to each sensor 15a to 15d the sleep mode release command. The sensors 15a to 15d returns to the normal operation mode in response to the sleep mode release command.

In the communications network according to the second embodiment, a plurality of sensors 15a to 15d is bus-connected to the ECU 18 to communicate with the ECU 18. Each sensor 15a to 15d has the acceleration detection circuit 24, the control circuit 25 and the current detection circuit 26. The acceleration detection circuit 24 detects the acceleration of the vehicle 10, and the control circuit 25 transmits the detected acceleration to the ECU 18. The current detection circuit 26 detects the output current flowing from the output side of each sensor. When the detected current is less than the threshold value, the control circuit 25 sets and stores the specific address in the memory 250. This specific address is different from the specific addresses set in the other sensors. The control circuit 25 notifies the other sensors of the specific address ADR=**. The control circuit 25** further transmits the notification indicative of the completion of address setting, and sets and proceeds to the specific mode, such as the sleep mode.

For example, when the supply of electric power is started in the vehicle 10, the output current of the fourth (last-stage) sensor 15d becomes approximately 0 mA, which is less than the predetermined threshold value. The current detection circuit 26 of the fourth sensor 15d detects this and the control circuit 25 of the fourth sensor 15d sets the specific address, which is not registered in the specific address registering circuit 252, in the memory 250 of the fourth sensor 15d. The control circuit 25 transmits the set specified address to the other sensors 15a to 15c. The control circuit 25 further transmits the notification indicative of the completion of address setting in the fourth sensor 15d and sets the fourth sensor 15d to operate in the specific mode, for example, sleep mode. With the fourth sensor 15d being set in the sleep mode, the output current of the third sensor 15c preceding the fourth sensor 15d becomes approximately 0 mA, which is less than the predetermined threshold value. The current detection circuit 26 of the third sensor 15c detects this and the control circuit 25 of the third sensor 15c sets the specific address in the memory 250 of the third sensor 15c. The control circuit 25 transmits the notification indicative of the completion of address setting in the third sensor 15d and sets the third sensor 15c to operate in the specific mode, for example, sleep mode. The similar operations are performed in the second sensor 15b and then in the first sensor 15a, and the specific addresses are set in the second sensor 15b and then in the first sensor 15a. By setting the different specific addresses in the sensors 15a to 15d, initialization of the sensors 15a to 15d is completed.

As described above, each sensor 15a to 15d need not have a bus switch. As a result, the size and cost of each sensor can be reduced, the voltage drop at the last-stage sensor can be reduced, and the noise generation due to unmatched impedance can be suppressed.

In the ECU 18, the communications control circuit 21 transmits the sleep mode release command to all the sensors 15a to 15d after receiving the notifications of all the sensors 15a to 15d indicating the completion of address setting. Thus, each sensor 15a to 15d is released from the sleep mode in response to the sleep mode release command, and returns to the normal operation mode.

Each sensor 15a to 15d receives the specific mode release command to return to the normal operation mode after completing the address setting. As a result, each sensor 15a to 15d is enabled to communicate with the ECU 18 in the normal operation mode by using its specific address.

Third Embodiment

Figure 7A:
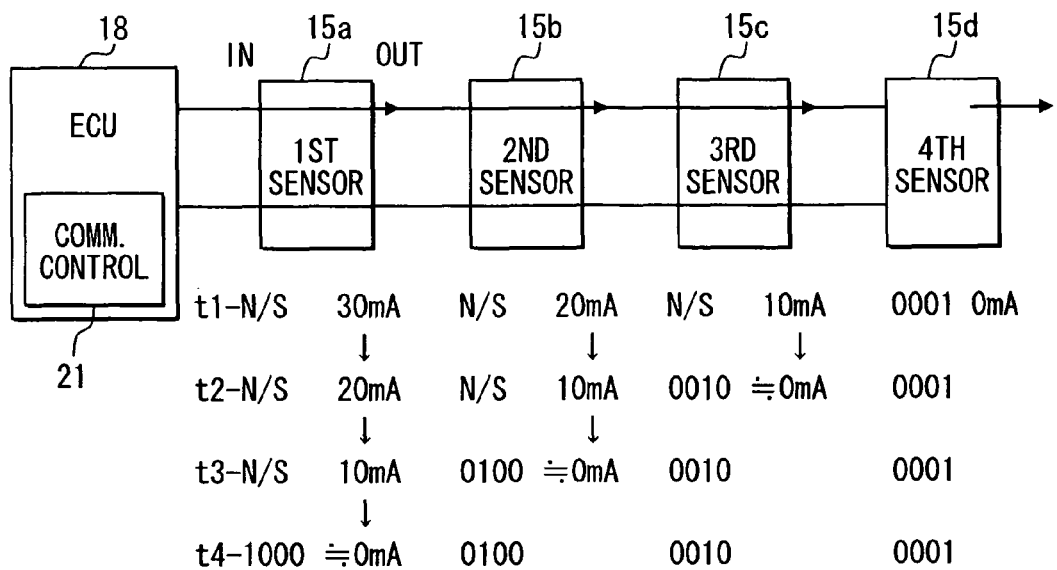
FIG. 7A is a schematic diagram showing a communications network of a passenger protection system according to a third embodiment of the present invention.
Figure 7B:
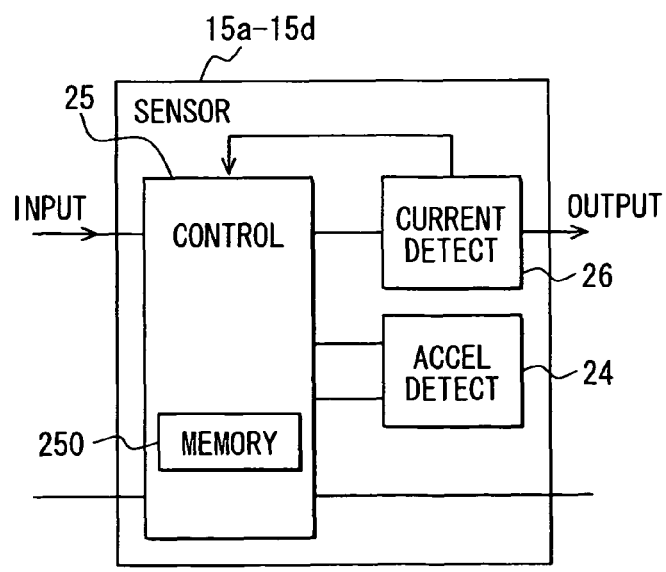
FIG. 7B is a block diagram showing each sensor in the third embodiment.

The third embodiment is shown in FIGS. 7A and 7B.

Figure 5B:
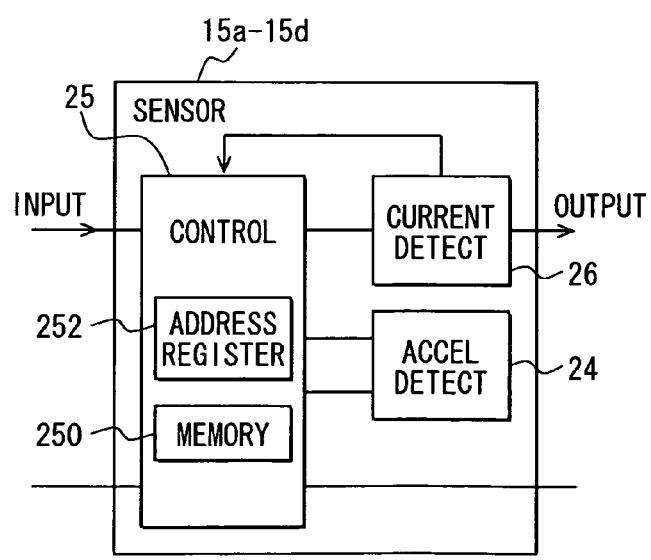
FIG. 5B is a block diagram showing each sensor in the second embodiment.

In the third embodiment, the control circuit 25 in each sensor 15a to 15d has no counter (251 in FIG. 3B) nor specific address registering circuit (252 in FIG. 5B) as opposed to the first and the second embodiment.

The ECU 18, specifically the communications control circuit 21, is configured to control communications with the sensors 15a to 15d. Specifically, the ECU 18 is configured to transmit specific addresses to sensors, which became operable to perform two-way communications (transmission and reception) after the supply of power is started in the vehicle 10. The specific addresses are different from one sensor to the other among the sensors 15a to 15d. The ECU 18 is configured to also transmit a specific mode release command to each sensor 15a to 15d after receiving from all the sensors 15a to 15d notifications indicating completion of setting the address, which are transmitted to the ECU 18

The control circuit 25 is configured to control communications, which includes transmission of the acceleration of the vehicle 10 detected by the acceleration detection circuit 24 to the ECU 18. When the current detected by the current detection circuit 26 is less than the predetermined threshold current, the control circuit 25 renders the sensor to be operable for communications at the time of the start of power supply and notify the ECU 18 of this condition. The control circuit 25 is further configured to store the specific address transmitted from the ECU 18 in its memory 250 and transmit a notification indicative of completion of setting the specific address. The control circuit 25 is configured to perform, after setting the specific address, control for proceeding to the specific mode. The control circuit 25 is configured to release the sensor from the specific mode and return the sensor to the normal operation mode, when the specific mode release command is received from the ECU 18.

Figure 8:
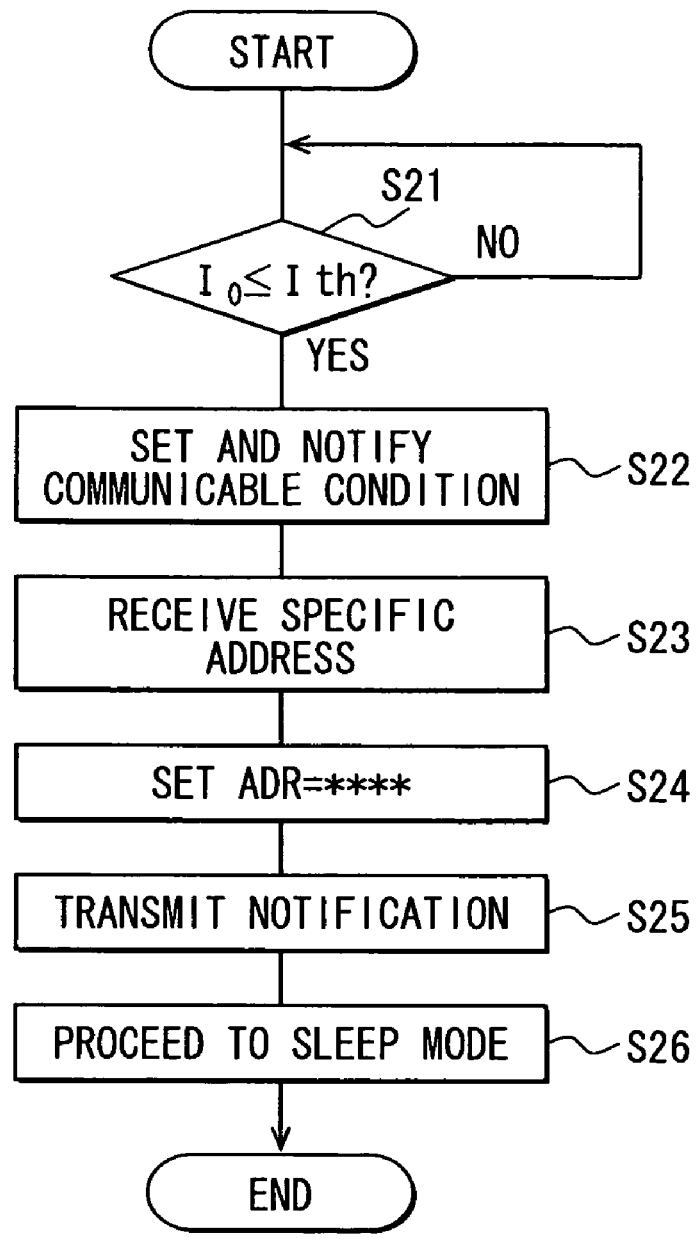
FIG. 8 is a flowchart showing processing performed by each sensor in the third embodiment.

The operation of the third embodiment is described with reference to the processing shown in FIG. 8, which is performed by the control circuit 25 in each sensor 15a to 15d.

This processing may be started when the power supply is started in the vehicle 10. It is assumed that the sensors 15a to 15d are in a condition of being able to receive signals, but are not set with the respective addresses.

First at step S21, it is checked in each sensor 15a to 15d whether the output current Io detected by the current detection circuit 26 is equal to or less than the predetermined threshold current Ith, which is about 0 mA. It is assumed here that, as shown at time t1 in FIG. 7A, the currents of the first to the fourth sensors 15a to 15d are 30 mA, 20 mA, 10 mA and 0 mA, respectively.

In this instance, the output current Io of the fourth sensor 15d detected by the current detection circuit 26 of the fourth sensor 15d is less than the predetermined threshold current Ith. With the check result is YES at step S21, the control circuit 25 of the fourth sensor 15d sets the fourth sensor 15d to be operable to perform two-way communications with the ECU 18 from the preceding condition, in which the sensor 15d is capable of performing one-way communications (only reception), and notifies the ECU 18 of this capability of two-way communications to the ECU 18.

The ECU 18 receives the notification of two-way communications condition from the fourth sensor 15d, it transmits the specific address ADR=****=0001 to the fourth sensor 15d. This address is predetermined to be exclusive to the fourth sensor 15d. The specific address from the ECU 18 is received at step S23, and the received address ADR=0001 is set and stored in the memory 250 at step S24. After this address setting, a notification is transmitted to the ECU 18 at step S25. This notification is indicative of completion of address setting in the fourth sensor 15d. Then, at step S26, the fourth sensor 15d is set to operate in the specific mode, for example, sleep mode.

After the fourth sensor 15d is set to the sleep mode, the output current Io of the third sensor 15c substantially becomes zero at time t2 as shown in FIG. 7A. The currents Io of the second sensor 15c and the first sensor 15a become 10 mA and 20 mA, respectively.

In this instance, the output current Io of the third sensor 15c detected by the current detection circuit 26 of the third sensor 15c is less than the predetermined threshold current Ith. With the check result being YES at step S21, steps S22 to S26 are repeated in the similar manner as described above in the third sensor 15c. As a result, the specific address ADR=0010 provided for the third sensor 15c is set in the third sensor 15c and stored in the memory 250. Thus, the third sensor 15c is set to operate in the sleep mode. The similar operations are performed in the second sensor 15b and then in the first sensor 15a, the specific addresses ADR=0100 and ADR=1000 are set in the second sensor 15b and then in the first sensor 15a, respectively.

When the ECU 18 receives the notifications from all the sensors 15a to 15d, the communications control circuit 21 transmits to each sensor 15a to 15d the sleep mode release command. The sensors 15a to 15d return to the normal operation mode in response to the sleep mode release command. In the communications network according to the third embodiment, the ECU 18 is provided with the communications control circuit 21, which transmits the specific addresses to the sensors 15a to 15d operable to transmit and receive signals. A plurality of sensors 15a to 15d is bus-connected to the ECU 18 to communicate with the ECU 18. Each sensor 15a to 15d has the acceleration detection circuit 24, the control circuit 25 and the current detection circuit 26. The acceleration detection circuit 24 detects the acceleration of the vehicle 10, and the control circuit 25 transmits the detected acceleration to the ECU 18. The current detection circuit 26 detects the output current of each sensor. When the detected current is less than the threshold value, the control circuit 25 sets the operation state to the two-way communications condition and notifies the ECU 18 of this condition. When the specific address transmitted from the ECU 18 in response to the notification of the two-way communications condition is received, the control circuit 25 sets the received specific address in the memory 250 and transmits the notification to the ECU 18 to indicate the completion of specific address setting. The control circuit 25 maintains the specific address and proceeds to the specific mode.

For example, when the supply of electric power is started in the vehicle 10, the output current of the fourth (last-stage) sensor 15d becomes approximately 0 mA, which is less than the predetermined threshold current. The current detection circuit 26 of the fourth sensor 15d detects this and the control circuit 25 of the fourth sensor 15d changes its condition to be able to both transmit and receive signals, and notifies the ECU 18 of this two-way communications condition. When the specific address transmitted from the ECU 18 in response to the notification of the two-way communications condition is received, the control circuit 25 sets the received specific address in the memory 250 and transmits the notification to the ECU 18 to indicate the completion of specific address setting. The control circuit 25 maintains the specific address and proceeds to, for example, the sleep mode among the specific modes. With the fourth sensor 15d being set in the sleep mode, the output current of the third sensor 15c preceding the fourth sensor 15d becomes approximately 0 mA, which is less than the predetermined threshold current. The similar operation is performed in the third sensor 15c as in the fourth sensor 15d. In addition, the similar operation is performed in the second and the first sensor 15b and 15d. Thus, the sensors 15a to 15d are initialized in order by setting the specific addresses, respectively.

As described above, each sensor 15a to 15d need not have a bus switch. As a result, the size and cost of each sensor can be reduced, the voltage drop at the last-stage sensor can be reduced, and the noise generation due to unmatched impedance can be suppressed.

In the ECU 18, the communications control circuit 21 transmits the sleep mode release command to all the sensors 15a to 15d after receiving the notifications of all the sensors 15a to 15d indicating the completion of address setting. Thus, each sensor 15a to 15d is released from the sleep mode in response to the sleep mode release command, and returns to the normal operation mode.

Each sensor 15a to 15d receives the specific mode release command to return to the normal operation mode after completing the address setting. As a result, each sensor 15a to 15d is enabled to communicate with the ECU 18 in the normal operation mode by using its specific address.

Fourth Embodiment

Figure 9A:
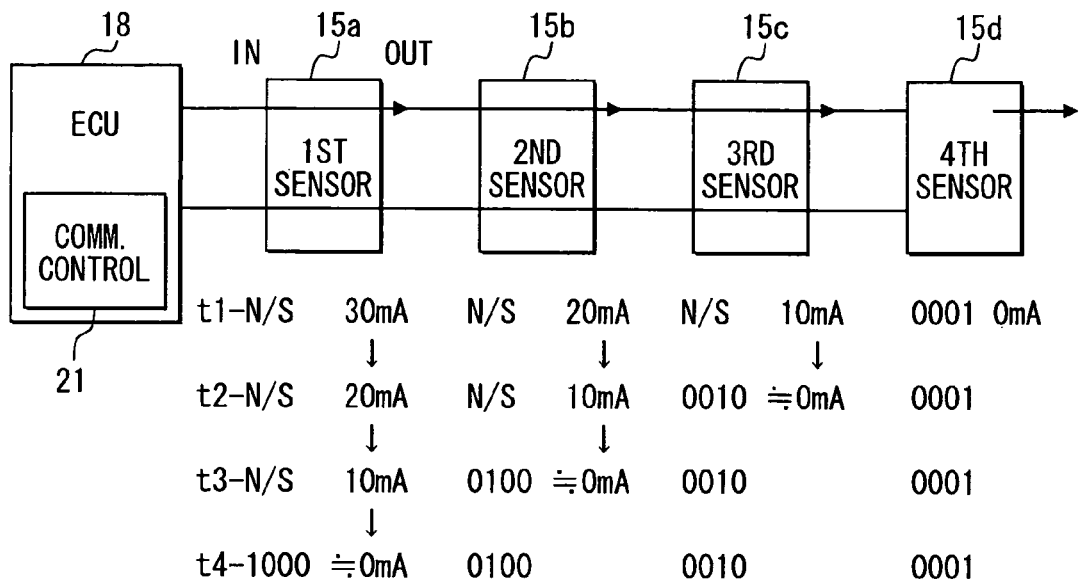
FIG. 9A is a schematic diagram showing a communications network of a passenger protection system according to a fourth embodiment of the present invention.
Figure 9B:
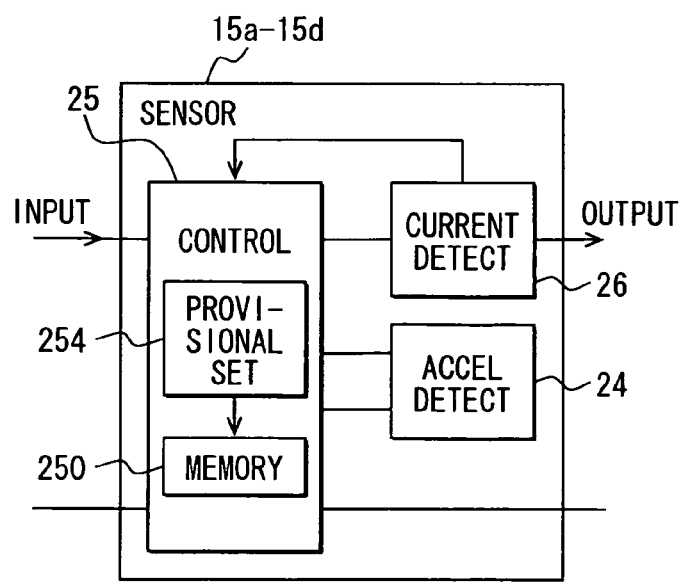
FIG. 9B is a block diagram showing each sensor in the fourth embodiment.

The fourth embodiment is shown in FIGS. 9A and 9B.

In the fourth embodiment, the control circuit 25 in each sensor 15a to 15d has a provisional setting circuit 254 in addition to the memory 250.

The ECU 18, specifically the communications control circuit 21, is configured to control communications with the sensors 15a to 15d. Specifically, the communications control circuit 21 is configured to store a predetermined correspondence relation between the sensors 15a to 15d and specific addresses provided differently for the sensors 15a to 15d. The communications control circuit 21 is configured to transmit a response of permission or prohibition (non-permission) of a requested address based on the stored correspondence relation, when a transmission of the address of a sensor is requested. The ECU 18 is also configured to transmit a specific mode release command to each sensor 15a to 15d after receiving from all the sensors 15a to 15d notifications indicating completion of setting the address, which are transmitted to the ECU 18.

The control circuit 25 is configured to control communications, which includes transmission of the acceleration of the vehicle 10 detected by the acceleration detection circuit 24 to the ECU 18. The control circuit 25 is configured to provisionally sets an address in the provisional setting circuit 254 and transmits a request of permission of this address to the ECU 18, when the output current detected by the current detection circuit 26 is less than the predetermined threshold current. The control circuit 25 is configured to provisionally set an address and request permission of this provisional address to the ECU again, when the response from the ECU 18 is prohibition. When the response is permission, this provisional address is fixed as the specific address and set in the memory 250. The control circuit 25 if configured to transmit a notification indicating completion of setting the specific address. The control circuit 25 is configured to perform control for proceeding to the specific mode after setting the specific address. The control circuit 25 is configured to release the sensor from the specific mode and return the sensor to the normal operation mode, when the specific mode release command is received from the ECU 18.

Figure 10:
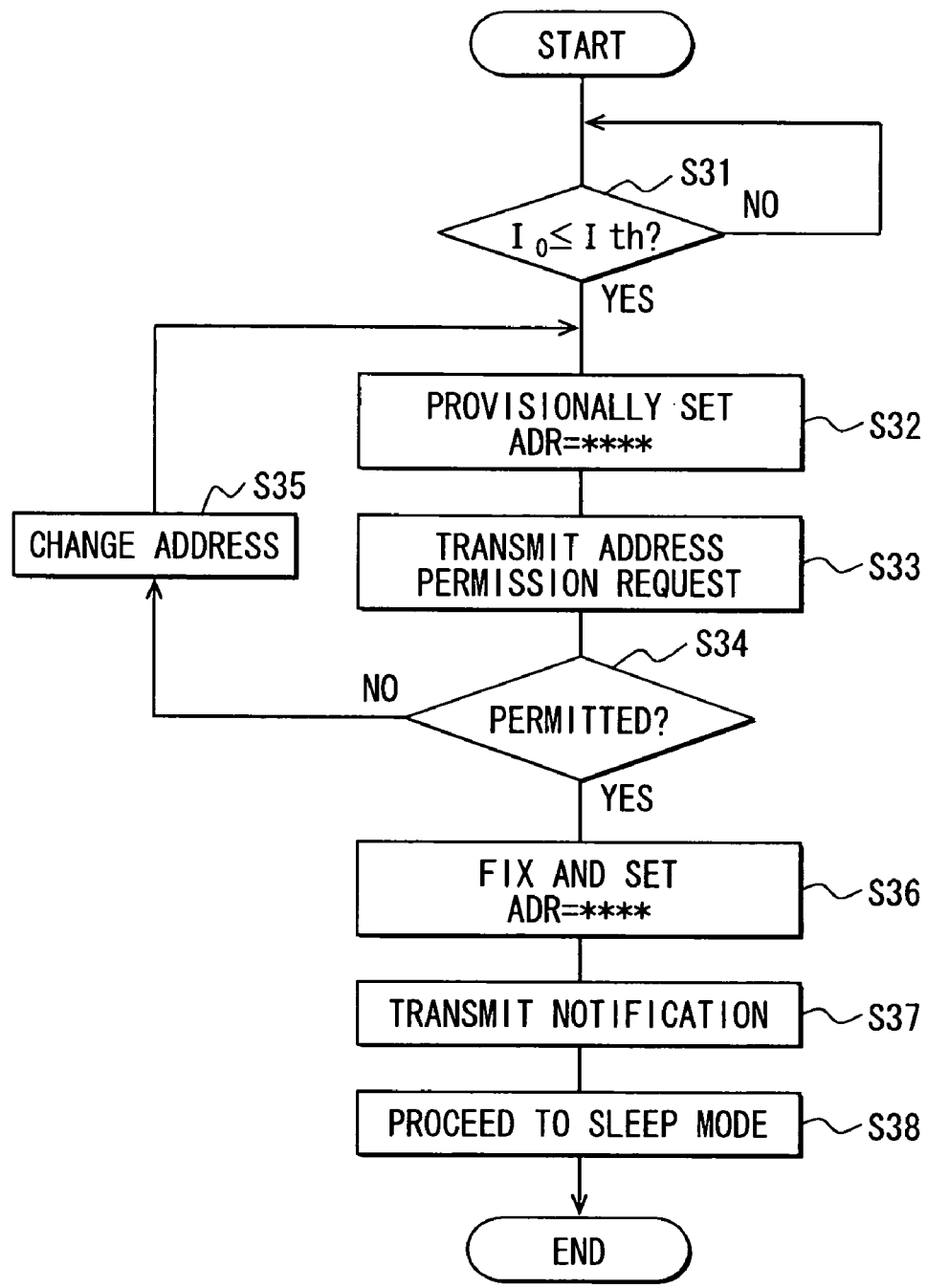
FIG. 10 is a flowchart showing processing performed by each sensor in the fourth embodiment.

The operation of the fourth embodiment is described with reference to the processing shown in FIG. 10, which is performed by the control circuit 25 in each sensor 15a to 15d.

This processing may be started when the power supply is started in the vehicle 10. It is assumed that the sensors 15a to 15d are not set with the respective specific addresses.

First at step S31, it is checked in each sensor 15a to 15d whether the output current Io detected by the current detection circuit 26 is equal to or less than the predetermined threshold current Ith, which is about 0 mA. It is assumed here that, as shown at time t1 in FIG. 9A, the output currents of the first to the fourth sensors 15a to 15d are 30 mA, 20 mA, 10 mA and 0 mA, respectively.

In this instance, the output current Io of the fourth sensor 15d detected by the current detection circuit 26 of the fourth sensor 15d is less than the predetermined threshold current Ith. With the check result being YES at step S31, the control circuit 25 of the fourth sensor 15d provisionally sets a specific address ADR=****=0001 at step S32. The control circuit 25 then transmits a request for permission of the address ADR=0001 to the ECU 18 at step S33.

In the ECU 18, the communications control circuit 21 checks if the provisionally set address ADR=0001 has already been set for any other sensors. If it has not yet been set, the communications control circuit 21 transmits a response of permission to the fourth sensor 15*d*, which requested the permission. The control circuit 25 checks at step S34 whether the response of permission is received from the ECU 18. If the check result of step S34 is YES indicating that the provisional address ADR=** is permitted for the fourth sensor 15***d*, this provisional address is fixed as the specific address ADR=0001 of the fourth sensor 15*d* and set in the memory 250 at step S36. After this address setting, a notification is transmitted to the ECU 18 at step S37. This notification is indicative of completion of address setting in the fourth sensor 15*d*. Then, at step S38, the fourth sensor 15*d* is set to operate in the specific mode, for example, sleep mode.

After the fourth sensor 15*d* is set to the sleep mode, the output current Io of the third sensor 15*c* substantially becomes zero at time t2 as shown in FIG. 9A. The currents Io of the second sensor 15*c* and the first sensor 15*a* become 10 mA and 20 mA, respectively.

In this instance, the output current Io of the third sensor 15*c* detected by the current detection circuit 26 of the third sensor 15*c* is less than the predetermined threshold current Ith. With the check result being YES at step S31, a specific address is provisionally set in the provisional setting circuit 254 at step S32 and the request for permission of the provisional address for the third sensor 15*c* is transmitted.

If the provisional address is set to ADR=0001 again at S32 and transmitted to the ECU 18 at step S33 for permission, such an address ADR=0001 is not permitted by the ECU 18 because it has already been permitted for the fourth sensor 15*d*. As a result, the check result at step S34 becomes NO. In this instance, the provisional address is changed to another provisional address, for example, ADR=0010 at step S35. This new address is provisionally set in the provisional setting circuit 254 at step S32 and a request for permission of the new address ADR=0010 is transmitted to the ECU 18 at step S33.

If a response of permission of ADR=0010 is received from the ECU 18, the check result of step S34 becomes YES. This permitted address is fixed and set as the specific address of the third sensor 15*c* at step S36. After this address setting, a notification is transmitted to the ECU 18 at step S37. This notification is indicative of completion of address setting in the third sensor 15*c*. Then, at step S38, the third sensor 15*d* is set to operate in the specific mode, for example, sleep mode.

The similar operations are performed in the second sensor 15*b* and then in the first sensor 15*a* so that the specific addresses ADR=0100 and ADR=1000 are set in the second sensor 15*b* and then in the first sensor 15*a*, respectively. If the output current Io supplied from the ECU 18 becomes substantially zero and the ECU 18 receives the notifications from all the sensors 15*a* to 15*d*, the sleep mode release command is transmitted from the ECU 18 to the sensors 15*a* to 15*d*. The sensors 15*a* to 15*d* return to the normal operation mode in response to the sleep mode release command.

In the communications network according to the fourth embodiment, the ECU 18 is provided with the communications control circuit 21, which stores the predetermined correspondence relation between the specific addresses and the sensors 15*a* to 15*d* and controls transmission of the response of permission or prohibition of the specific address upon receiving the request for permission of the provisionally set address.

The plurality of sensors 15*a* to 15*d* is bus-connected to the ECU 18 to communicate with the ECU 18. Each sensor 15*a* to 15*d* has the acceleration detection circuit 24, the control circuit 25 and the current detection circuit 26. The acceleration detection circuit 24 detects the acceleration of the vehicle 10, and the control circuit 25 transmits the detected acceleration to the ECU 18. The current detection circuit 26 detects the output current flowing from the output side of each sensor. When the detected current is less than the threshold current, the address is provisionally set and transmitted to the ECU 18 along with the request for permission. If the request is not permitted, the provisional setting of a new address and request for permission is transmitted to the ECU 18 again. If the request, that is, the provisional address, is permitted, the provisional address is fixed as the specific address for the sensor and stored in the memory 250. This completion of address setting is transmitted as the notification to the ECU 18. Further, the specific address is stored and the sensor is set to operate in the specific mode.

For example, when the supply of electric power is started in the vehicle 10, the output current of the fourth (last-stage) sensor 15*d* among the first to the fourth sensor 15*a* to 15*d* becomes approximately 0 mA, which is less than the predetermined threshold current. The current detection circuit 26 of the fourth sensor 15*d* detects this and the control circuit 25 provisionally sets the address and transmits the request for permission of this provisional address to the ECU 18. If the response from the ECU 18 is the prohibition, the provisional address is set anew and the request for permission of the new address is transmitted again to the ECU 18 by the control circuit 25. If the response is the permission, the new address is finally set as the specific address and stored in the memory 250. The notification indicating the completion of setting the specific address is transmitted to the ECU 18 and the sensor lid is put in the sleep mode, which is one of the specific modes. With the fourth sensor 15*d* being set in the sleep mode, the output current of the third sensor 15*c* preceding the fourth sensor 15*d* becomes approximately 0 mA, which is less than the predetermined threshold current. The similar operation is performed in the third sensor 15*c* as in the fourth sensor 15*d*. In addition, the similar operation is performed in the second and the first sensor 15*b* and 15*d*. Thus, the sensors 15*a* to 15*d* are initialized in order by setting the specific addresses, respectively.

As described above, each sensor 15*a* to 15*d* need not have a bus switch. As a result, the size and cost of each sensor can be reduced, the voltage drop at the last-stage sensor can be reduced, and the noise generation due to unmatched impedance can be suppressed.

In the ECU 18, the communications control circuit 21 transmits the sleep mode release command to all the sensors 15*a* to 15*d* after receiving the notifications of all the sensors 15*a* to 15*d* indicating the completion of address setting. Thus, each sensor 15*a* to 15*d* is released from the sleep mode in response to the sleep mode release command, and returns to the normal operation mode.

Each sensor 15*a* to 15*d* receives the specific mode release command to return to the normal operation mode after completing the address setting. As a result, each sensor 15*a* to 15*d* is enabled to communicate with the ECU 18 in the normal operation mode by using its specific address.

Fifth Embodiment

Figure 11A:
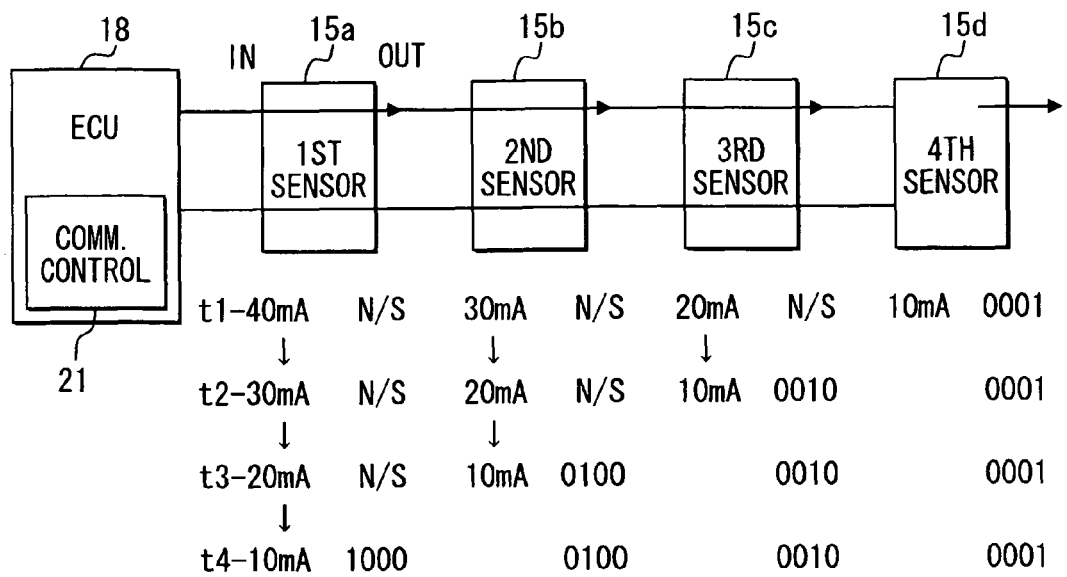
FIG. 11A is a schematic diagram showing a communications network of a passenger protection system according to a fifth embodiment of the present invention.
Figure 11B:
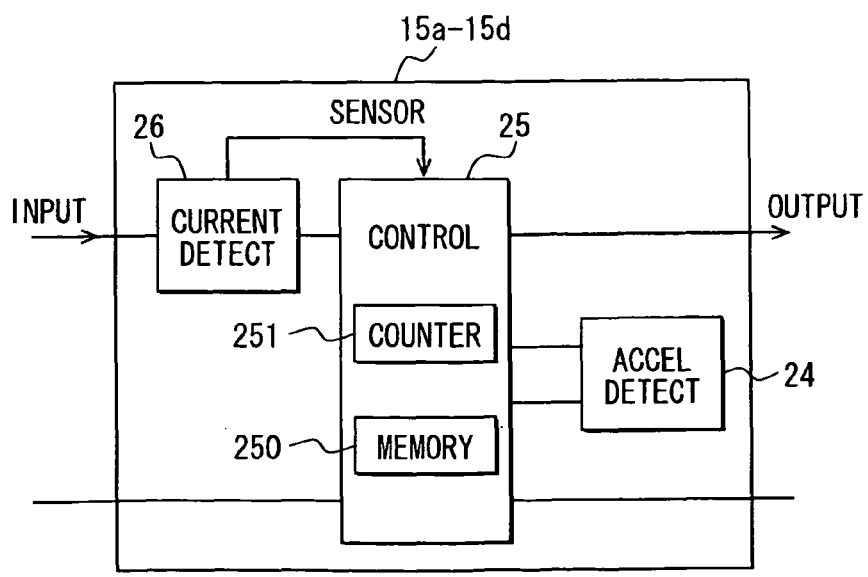
FIG. 11B is a block diagram showing each sensor in the fifth embodiment.

The fifth embodiment is shown in FIGS. 11A and 11B as a modification of the first embodiment. The fifth embodiment may also be applied as modifications to the second to the fourth embodiments.

The fifth embodiment is different from the first embodiment in that the current detection circuit 26 is provided at the input side of each sensor 15*a* to 15*d* to detect an input current of each sensor supplied from the preceding stage. The control circuit 25 is configured to perform the similar control as in the first embodiment based on the detected input current.

When all the sensors 15a to 15d are in the normal operation mode, all of the first to the fourth sensors 15a to 15d are connected operatively to the ECU 18 at time t1 as shown in FIG. 11A. In this case, the currents Ii flowing in the input sides of the first to the fourth sensors 15a to 15d are 40 mA, 30 mA, 20 mA and 10 mA, respectively. A predetermined threshold current Ith' may be set to 10 mA.

When the input current Ii is equal to or greater than the threshold current Ith, that is, the current of the sensor attains the predetermined relation, the counter 251 starts to increment its count C. The specific addresses are set in accordance with the count C of the counter 251 and stored in the memory 250. The control circuit 25 transmits the notification to notify the ECU 18 of the completion of setting the specific address. The control circuit 25 maintains the specific address and controls proceeding to the specific mode. The control circuit 25 controls return to the normal operation mode by releasing the sensor from the specific mode when the specific mode release command is received from the ECU 18.

The fifth embodiment provides the similar advantages as provided in the first to the fourth embodiments.

What is claimed is:

1. A communications network for a passenger protection system of a vehicle including a passenger protection device, the communications network comprising:
   an ECU configured to control the passenger protection device upon collision of the vehicle; and
   a plurality of sensors bus-connected to the ECU and configured to detect and transmit an acceleration of the vehicle, the plurality of sensors being set with respective addresses and transmitting notifications of completion of setting respective addresses to the ECU at time of initialization for communications with the ECU,
   wherein each of the sensors includes
      a current detection circuit configured to detect a current value of a current flowing to an output side, which is opposite to an input side that is on a side of the ECU, and
      a control circuit configured to set a specific address in a memory when the current value detected by the current detection circuit is less than a predetermined threshold current, to transmit the notification of completion of setting the specific address to the ECU, to store the specific address after setting, and to control a mode of the sensor to a specific mode, which consumes current less than the predetermined threshold current.

2. A communications network for a passenger protection system of a vehicle including a passenger protection device, the communications network comprising:
   an ECU configured to control the passenger protection device upon collision of the vehicle; and
   a plurality of sensors bus-connected to the ECU and configured to detect and transmit an acceleration of the vehicle, the plurality of sensors being set with respective addresses and transmitting notifications of completion of setting respective addresses to the ECU at time of initialization for communications with the ECU,
   wherein each of the sensors includes
      a current detection circuit configured to detect a current value of a current flowing to an output side, which is opposite to an input side that is on a side of the ECU, and
      a control circuit being configured to set a specific address, which is different from addresses set in other sensors of the plurality of sensors, in a memory when the current value detected by the current detection circuit is less than a predetermined threshold current, to notify the specific address to the other sensors, to transmit the notification of completion of setting the specific address to the ECU, to store the specific address after setting, and to control a mode of the sensor to a specific mode, which consumes current less than the predetermined threshold current.

3. A communications network for a passenger protection system of a vehicle including a passenger protection device, the communications network comprising:
   an ECU configured to control the passenger protection device upon collision of the vehicle; and
   a plurality of sensors bus-connected to the ECU and configured to detect and transmit an acceleration of the vehicle, the plurality of sensors being set with respective addresses and transmitting notifications of completion of setting respective addresses to the ECU at time of initialization for communications with the ECU,
   wherein the ECU includes
      a communications control circuit configured to transmit the specific address to the sensor which is rendered operative to perform a two-way communications of transmitting and receiving signals, and
   wherein each of the sensors includes
      a current detection circuit configured to detect a current value of a current flowing to an output side, which is opposite to an input side that is on a side of the ECU, and
      a control circuit being configured to render the sensor to a two-way communications condition, in which both signal transmission and signal reception are possible, from a one-way communications condition, in which only signal reception is possible, when a current value of the current detected by the current detection is less than a predetermined threshold value, to notify the ECU of the two-way communications condition, to store the specific address in a memory when the specific address is transmitted from the ECU after a notification of the two-way communications condition, transmit a notification of completion of setting the specific address to the ECU, to maintain the specific address after setting, and to control a mode of the sensor to a specific mode, which consumes current less than the predetermined threshold current.

4. A communications network for a passenger protection system of a vehicle including a passenger protection device, the communications network comprising:
   an ECU configured to control the passenger protection device upon collision of the vehicle; and
   a plurality of sensors bus-connected to the ECU and configured to detect and transmit an acceleration of the vehicle, the plurality of sensors being set with respective addresses and transmitting notifications of completion of setting respective addresses to the ECU at time of initialization for communications with the ECU,
   wherein the ECU includes a communications control circuit configured to store a correspondence relation between the plurality of sensors and specific addresses, and to transmit a response indicating permission or prohibition of a request address in accordance with the correspondence relation when a request for permission of using an address is made from a sensor of the plurality of sensors,
   wherein each of the sensors includes a current detection circuit configured to detect a current value of a current flowing to an output side, which is opposite to an input side that is on a side of the ECU, and a control circuit is configured to set a provisional address when the current value detected by the current detection circuit is less than a predetermined threshold value, to transmit a request for permission of the provisional address to the ECU, to set the provisional address and transmit the request again when the request is not accepted, to fix and set, to store the specific address in the memory, and to control a mode of the sensor to a specific mode, which consumes current less than the predetermined threshold current.

5. The communications network according to claim 1, wherein:
the predetermined threshold current is less than an operation current required for the sensor to operate in a normal communications mode of the sensor.

6. The communications network according to claim 2, wherein:
the predetermined threshold current is less than an operation current required for the sensor to operate in a normal communications mode of the sensor.

7. The communications network according to claim 3, wherein:
the predetermined threshold current is less than an operation current required for the sensor to operate in a normal communications mode of the sensor.

8. The communications network according to claim 4, wherein:
the predetermined threshold current is less than an operation current required for the sensor to operate in a normal communications mode of the sensor.

9. The communications network according to claim 1, wherein:
the ECU includes a communications control circuit configured to transmit a command of releasing the specific mode to all the plurality of sensors when notifications of completion of setting the specific addresses are received from all of the plurality of sensors; and
the control circuit of the sensor is configured to return the sensor from the specific mode to a normal operation mode upon receiving the command of releasing the specific mode from the communications control circuit.

10. The communications network according to claim 2, wherein:
the ECU includes a communications control circuit configured to transmit a command of releasing the specific mode to all the plurality of sensors when notifications of completion of setting the specific addresses are received from all of the plurality of sensors; and
the control circuit of the sensor is configured to return the sensor from the specific mode to a normal operation mode upon receiving the command of releasing the specific mode from the communications control circuit.

11. The communications network according to claim 3, wherein:
the ECU includes a communications control circuit configured to transmit a command of releasing the specific mode to all the plurality of sensors when notifications of completion of setting the specific addresses are received from all of the plurality of sensors; and
the control circuit of the sensor is configured to return the sensor from the specific mode to a normal operation mode upon receiving the command of releasing the specific mode from the communications control circuit.

12. The communications network according to claim 4, wherein:
the ECU includes a communications control circuit configured to transmit a command of releasing the specific mode to all the plurality of sensors when notifications of completion of setting the specific addresses are received from all of the plurality of sensors; and
the control circuit of the sensor is configured to return the sensor from the specific mode to a normal operation mode upon receiving the command of releasing the specific mode from the communications control circuit.

13. The communications network according to claim 1, wherein:
the current detection circuit is configured to detect a current value of a current which flows to the input side, which is on the side of the ECU in place of the current value of the current flowing to the output side; and
the control circuit is configured to perform the control when the current value detected by the current detection circuit becomes greater than the predetermined threshold value.

14. The communications network according to claim 2, wherein:
the current detection circuit is configured to detect a current value of a current which flows to the input side, which is on the side of the ECU in place of the current value of the current flowing to the output side; and
the control circuit is configured to perform the control when the current value detected by the current detection circuit becomes greater than the predetermined threshold value.

15. The communications network according to claim 3, wherein:
the current detection circuit is configured to detect a current value of a current which flows to the input side, which is on the side of the ECU in place of the current value of the current flowing to the output side; and
the control circuit is configured to perform the control when the current value detected by the current detection circuit becomes greater than the predetermined threshold value.

16. The communications network according to claim 4, wherein:
the current detection circuit is configured to detect a current value of a current which flows to the input side, which is on the side of the ECU in place of the current value of the current flowing to the output side; and
the control circuit is configured to perform the control when the current value detected by the current detection circuit becomes greater than the predetermined threshold value.

17. The communications network according to claim 5, wherein:
the ECU includes a communications control circuit configured to transmit a command of releasing the specific mode to all the plurality of sensors when notifications of completion of setting the specific addresses are received from all of the plurality of sensors; and
the control circuit of the sensor is configured to return the sensor from the specific mode to a normal operation mode upon receiving the command of releasing the specific mode from the communications control circuit.

18. The communications network according to claim 6, wherein:
the ECU includes a communications control circuit configured to transmit a command of releasing the specific mode to all the plurality of sensors when notifications of completion of setting the specific addresses are received from all of the plurality of sensors; and the control circuit of the sensor is configured to return the sensor from the specific mode to a normal operation mode upon receiving the command of releasing the specific mode from the communications control circuit.

19. The communications network according to claim 7, wherein:
the ECU includes a communications control circuit configured to transmit a command of releasing the specific mode to all the plurality of sensors when notifications of completion of setting the specific addresses are received from all of the plurality of sensors; and
the control circuit of the sensor is configured to return the sensor from the specific mode to a normal operation mode upon receiving the command of releasing the specific mode from the communications control circuit.

20. The communications network according to claim 8, wherein:
the ECU includes a communications control circuit configured to transmit a command of releasing the specific mode to all the plurality of sensors when notifications of completion of setting the specific addresses are received from all of the plurality of sensors; and
the control circuit of the sensor is configured to return the sensor from the specific mode to a normal operation mode upon receiving the command of releasing the specific mode from the communications control circuit.

21. The communications network according to claim 17, wherein:
the current detection circuit is configured to detect a current value of a current which flows to the input side, which is on the side of the ECU in place of the current value of the current flowing to the output side; and
the control circuit is configured to perform the control when the current value detected by the current detection circuit becomes greater than the predetermined threshold value.

22. The communications network according to claim 18, wherein:
the current detection circuit is configured to detect a current value of a current which flows to the input side, which is on the side of the ECU in place of the current value of the current flowing to the output side; and
the control circuit is configured to perform the control when the current value detected by the current detection circuit becomes greater than the predetermined threshold value.

23. The communications network according to claim 19, wherein:
the current detection circuit is configured to detect a current value of a current which flows to the input side, which is on the side of the ECU in place of the current value of the current flowing to the output side; and
the control circuit is configured to perform the control when the current value detected by the current detection circuit becomes greater than the predetermined threshold value.

24. The communications network according to claim 20, wherein:
the current detection circuit is configured to detect a current value of a current which flows to the input side, which is on the side of the ECU in place of the current value of the current flowing to the output side; and
the control circuit is configured to perform the control when the current value detected by the current detection circuit becomes greater than the predetermined threshold value.

* * * * *